United States Patent
Fujiyama et al.

(10) Patent No.: US 8,289,855 B2
(45) Date of Patent: Oct. 16, 2012

(54) FAULT NOTIFICATION METHOD AND COMMUNICATION APPARATUS

(75) Inventors: Hirofumi Fujiyama, Osaka (JP); Satoshi Tomie, Osaka (JP); Masaki Hiromori, Osaka (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 12/706,018

(22) Filed: Feb. 16, 2010

(65) Prior Publication Data

US 2010/0211831 A1  Aug. 19, 2010

(30) Foreign Application Priority Data

Feb. 19, 2009  (JP) .................................. 2009-036745

(51) Int. Cl.
*G01R 31/08* (2006.01)
(52) U.S. Cl. ........................................ 370/242; 370/252
(58) Field of Classification Search .................. 370/242, 370/243, 244, 245, 248, 252
See application file for complete search history.

(56) References Cited

U.S. PATENT DOCUMENTS

| | | | | |
|---|---|---|---|---|
| 4,991,174 | A | * | 2/1991 | Mori et al. ....................... 714/10 |
| 5,586,112 | A | * | 12/1996 | Tabata ........................... 370/225 |
| 5,625,621 | A | * | 4/1997 | Christensen et al. ......... 370/248 |
| 6,222,854 | B1 | * | 4/2001 | Dove ............................. 370/465 |
| 2007/0022331 | A1 | * | 1/2007 | Jamieson et al. ............. 714/712 |
| 2008/0037526 | A1 | * | 2/2008 | Dong ............................ 370/352 |

FOREIGN PATENT DOCUMENTS

JP  2004-15216 A  1/2004

* cited by examiner

*Primary Examiner* — Ricky Ngo
*Assistant Examiner* — Christine Ng
(74) *Attorney, Agent, or Firm* — Fujitsu Patent Center (57) ABSTRACT

A method of fault notification in a communication apparatus, including terminating transmission of a signal over a transmission link; determining whether or not a specified fault notification signal is detected in a reception link and storing a determination result from the determining; and upon detection of a fault in the reception link after starting an operation, outputting a specified fault notification signal to the transmission link when the stored determination result is affirmative.

5 Claims, 12 Drawing Sheets

| OPERATION DEFINITION TABLE | FAULT NOTIFICATION OPERATION |
|---|---|
| FEFI FUNCTION DETERMINATION | |
| ABSENT | "1":TX_DISABLE (OPTICAL OUTPUT TERMINATION) |
| PRESENT | "2":FEFI_GEN_CONTROL (FEFI SIGNAL OUTPUT) |

FAULT NOTIFICATION METHOD AND COMMUNICATION APPARATUS

CROSS-REFERENCE TO RELATED APPLICATION(S)

This application is based upon and claims the benefit of priority of the prior Japanese Patent Application No. 2009-036745, filed on Feb. 19, 2009, the entire contents of which are incorporated herein by reference.

FIELD

Embodiments discussed herein are related to a fault notification method and a communication apparatus.

BACKGROUND

The high-speed Ethernet (registered trademark) specifications (100BASE-X) that enable a communication speed of up to 100 Mbps include 100BASE-TX using twisted-pair cables and 100BASE-FX using optical fibers. 100BASE-FX is a full-duplex (fixed) interface, defined by IEEE 802.3, with a transmission speed of 100 Mbps using optical fibers.

Figure 7:
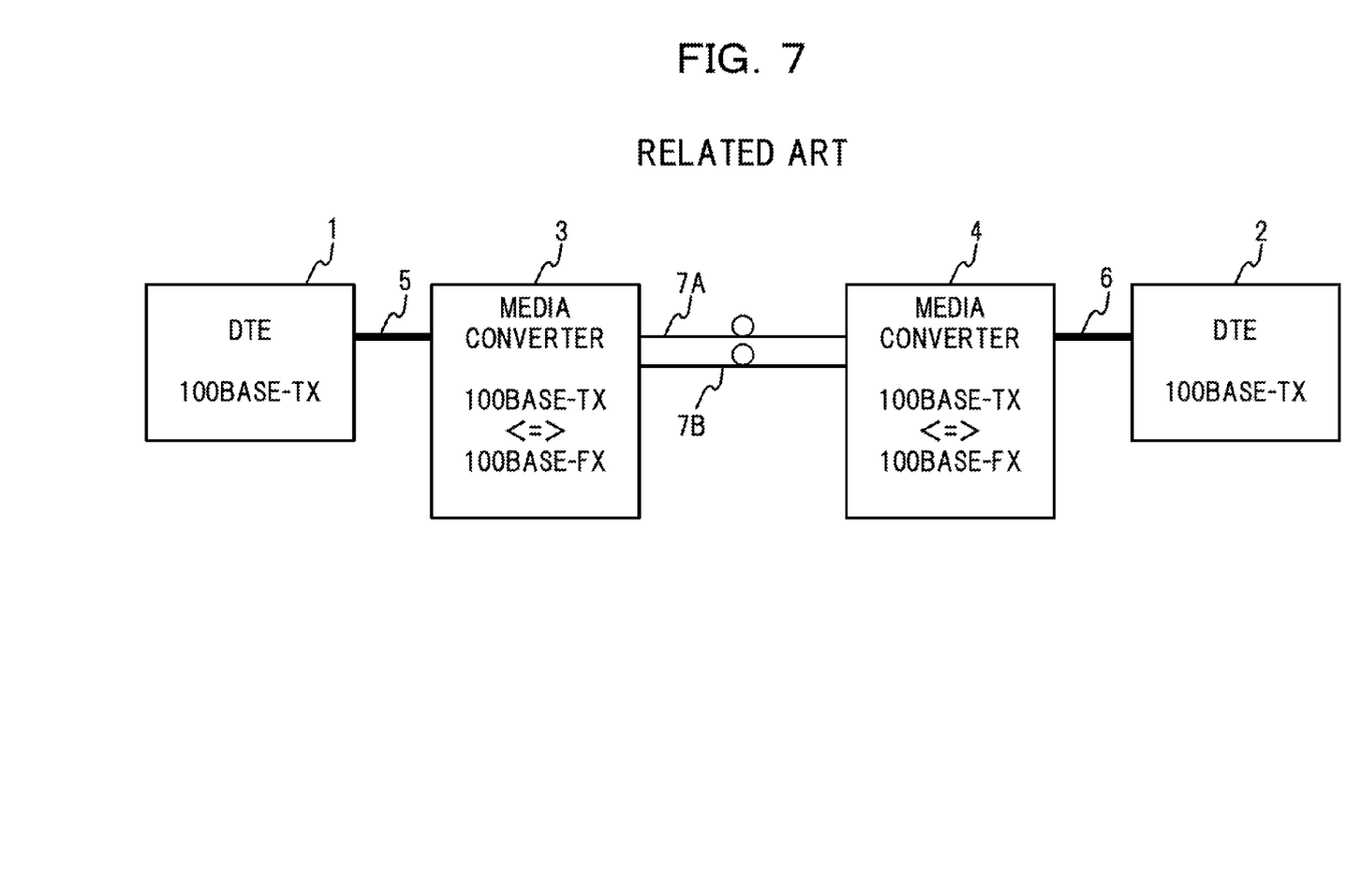
FIG. 7 is a diagram illustrating an example configuration for connecting apparatuses having 100BASE-TX interfaces to each other via media converters.

A typical configuration for connecting communication apparatuses (e.g., data terminal equipment (DTE)), provided with 100BASE-TX interfaces, using an optical fiber is as follows. That is, referring to FIG. 7, connection is realized using media converters for signal-form conversion between 100BASE-TX and 100BASE-FX. In the example illustrated in FIG. 7, data terminal equipment (DTE) 1 and data terminal equipment (DTE) 2 each including a 100BASE-TX interface are connected to each other via media converters 3 and 4. The DTE 1 and the media converter 3 are connected to each other by an unshielded twisted pair (UTP) cable 5, and the DTE 2 and the media converter 4 are connected to each other by a UTP cable 6. The media converters 3 and 4 are connected to each other by optical fibers 7A and 7B.

Figure 8:
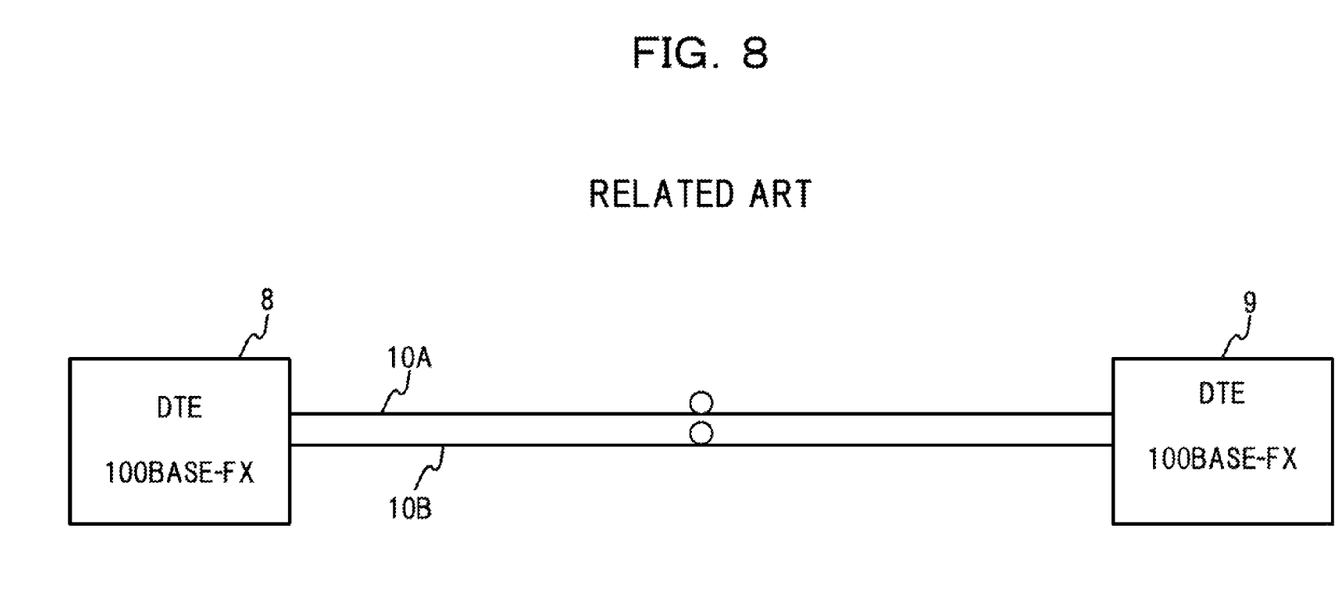
FIG. 8 is a diagram illustrating an example configuration in which apparatuses having 100BASE-FX interfaces are directly connected to each other using optical fibers.

On the other hand, communication apparatuses each provided with a 100BASE-FX interface are directly connected to each other by two optical fibers, one for transmission and the other for reception. Referring to FIG. 8, DTE 8 and DTE 9 each provided with a 100BASE-FX interface are connected to each other by optical fibers 10A and 10B.

100BASE-FX does not support an auto-negotiation function, which is supported by 100BASE-TX. The auto-negotiation function is a function of automatically setting an optimal mode of connection between two connected devices (ports) by performing negotiation regarding communication speeds, communication modes (half-duplex/full-duplex), and the like, between the two connected devices. Hence, when a certain communication apparatus having a 100BASE-FX interface has become unable to receive a signal from a remote communication apparatus, remote fault notification (fault notification) is performed by using a Far-End Fault Indication (FEFI) function instead of using remote fault notification based on the auto-negotiation function.

An FEFI signal is a fault notification signal defined by IEEE 802.3 Clause 24.3.2.1. The FEFI signal is a signal forcibly transmitted irrespective of the data of a media independent interface (MII) when data reception disruption (loss of signal (LOS) of a reception signal) is detected at a 100BASE-FX interface.

Figure 9:
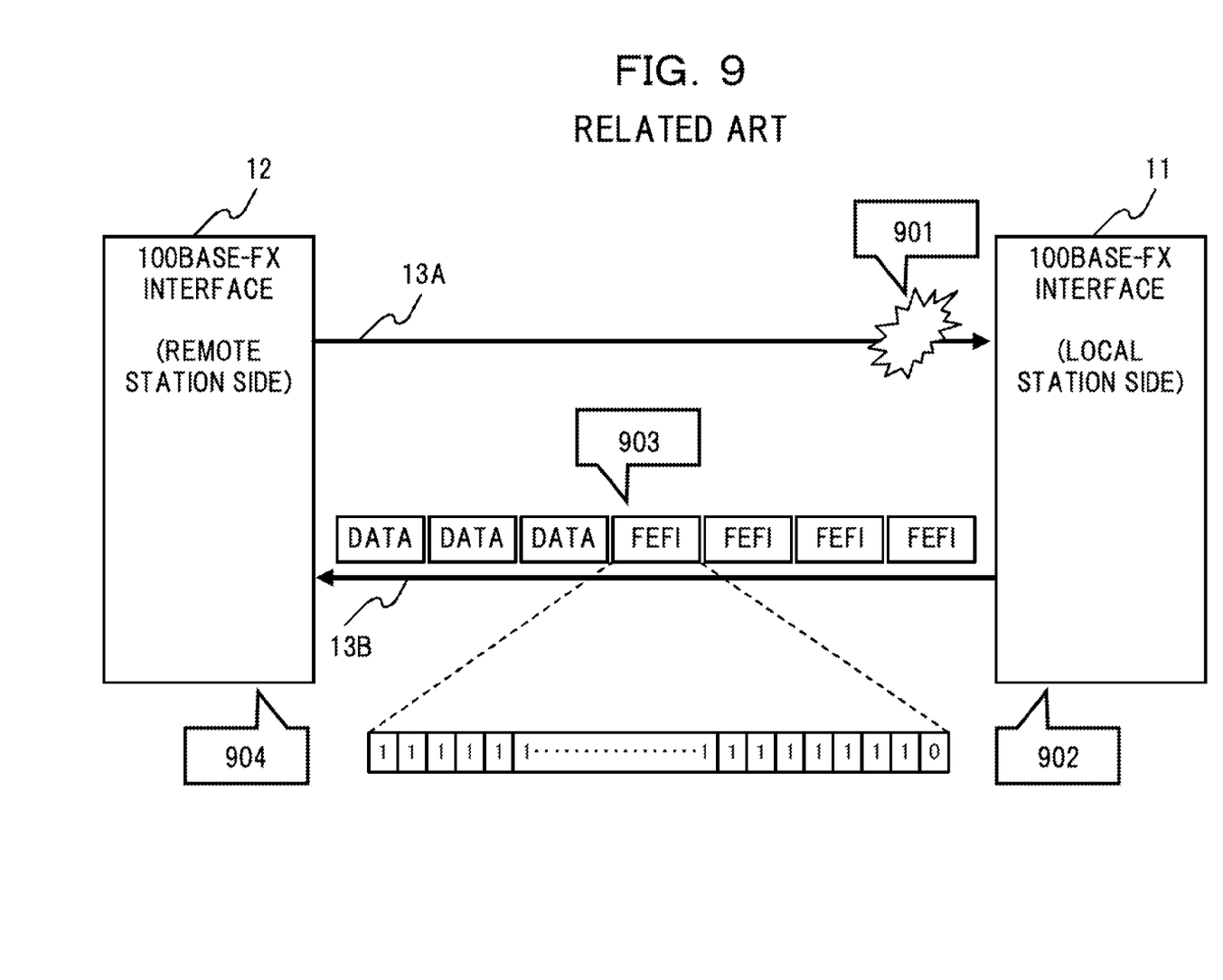
FIG. 9 is a general explanatory diagram illustrating the FEFI function.

FIG. 9 is a general explanatory diagram illustrating the FEFI function. In the example illustrated in FIG. 9, a communication apparatus 11 (on a local station side) including a 100BASE-FX interface apparatus is connected to a communication apparatus 12 (on a remote station side) including a 100BASE-FX interface apparatus by optical fibers 13A and 13B. The communication apparatus 11 receives a signal transmitted from the communication apparatus 12 through the optical fiber 13A, and transmits a signal to the communication apparatus 12 through the optical fiber 13B.

When a fault occurs in the optical fiber 13A (901 in FIG. 9), a signal which is input to the communication apparatus 11 from the communication apparatus 12 stops, and the communication apparatus 11, upon detection of the LOS of the reception signal, starts to output FEFI signals (902 in FIG. 9). The FEFI signals are continuously transmitted through the optical fiber 13B (903 in FIG. 9). The format of a single FEFI signal is eighty-four "1s" followed by one "0". The communication apparatus 12, upon detecting three FEFI signals in succession, determines that an abnormality exists (detection of abnormality) in the outgoing line, which is the optical fiber 13A (904 in FIG. 9). As described above, the FEFI function includes the function of generating an FEFI signal upon occurrence of a fault (for example, an LOS due to a link fault) and notifying a remote station of the signal, and the function of detecting a fault through detection of an FEFI signal from the remote apparatus.

A technique of the related art has been disclosed in Japanese Unexamined Patent Application Publication No. 2004-15216.

SUMMARY

According to an aspect of the invention, a method of fault notification in a communication apparatus includes: terminating transmission of a signal over a transmission link, determining whether or not a specified fault notification signal is detected in a reception link and storing a determination result from the determining; and upon detection of a fault in the reception link after starting an operation, outputting a specified fault notification signal to the transmission link when the stored determination result is affirmative.

According to another aspect of the invention, a communication apparatus includes: a remote apparatus interface unit connected to a remote apparatus via a reception link and a transmission link and detects via the reception signal from the remote apparatus, and configured to control signal transmission via the transmission link to the remote apparatus according to an instruction; a signal processing unit that is substantially connected to the remote apparatus interface unit and is configured to detect a fault notification signal, transmitted from the remote apparatus, indicating a reception fault at the remote apparatus; and an apparatus controller substantially connected to the remote apparatus interface unit and the signal processing unit, wherein the apparatus controller includes: a determination unit that determines whether or not the remote apparatus has a function to transmit a fault notification signal; and a notification controller that, upon detection of a fault in the reception link, performs control of a fault notification operation, which is different from a control of the function to transmit a fault notification signal, for the remote apparatus interface unit when it is determined that the remote apparatus does not have the fault notification to transmit a fault notification signal.

It is to be understood that both the foregoing summary description and the following detailed description are exemplary and explanatory and are not restrictive of the invention, as claimed.

DESCRIPTION OF EMBODIMENT(S)

There are cases in which a communication apparatus provided with a 100BASE-FX interface having an FEFI function is connected to a communication apparatus (such as a media converter or a transmission device) provided with a 100BASE-FX interface which does not have the FEFI function.

Figure 10:
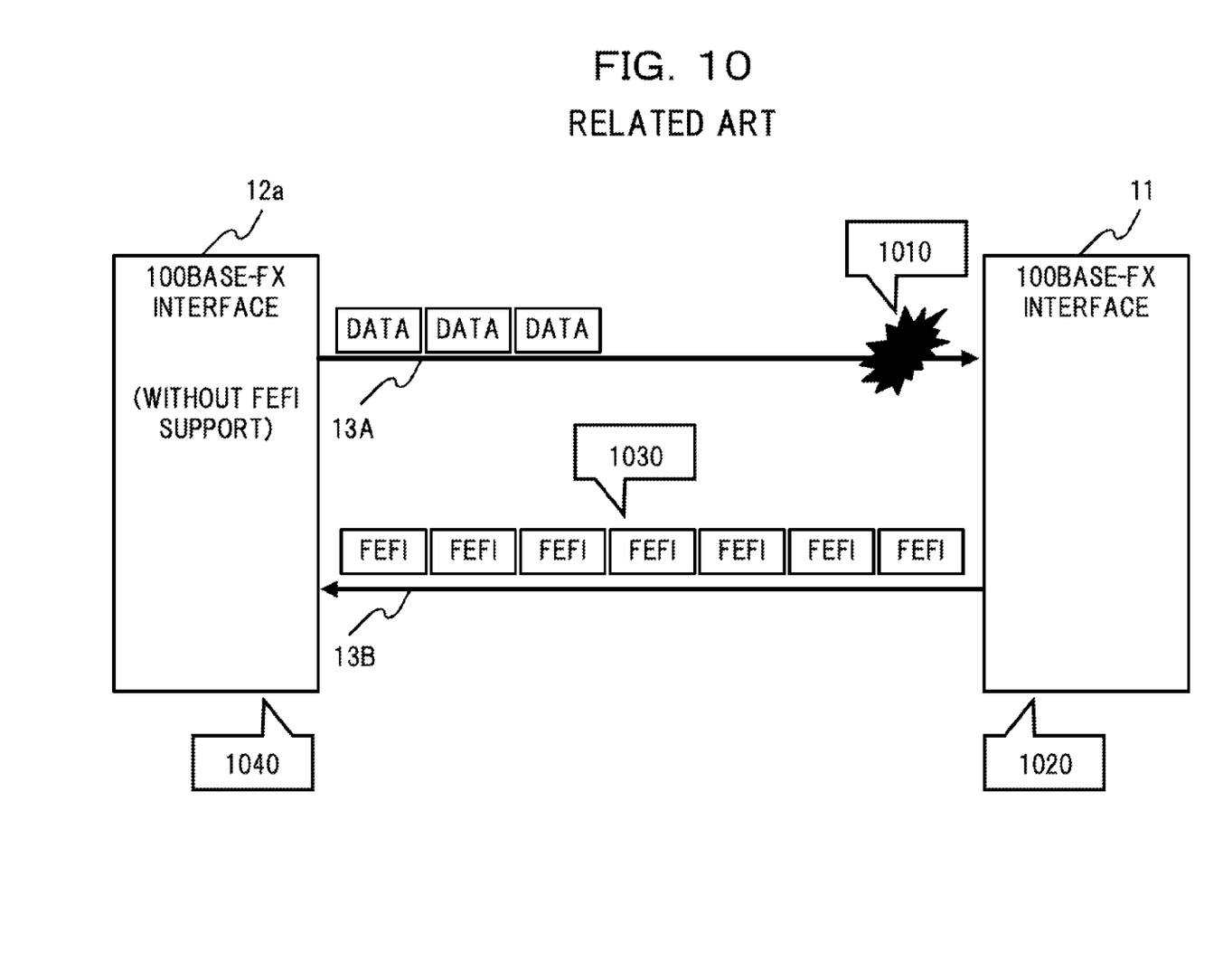
FIG. 10 is a diagram illustrating a problem of the related art.

For instance, referring to FIG. 10, there is a case in which the communication apparatus 11 having an FEFI function is connected by the optical fibers 13A and 13B to a communication apparatus 12a (provided with a 100BASE-FX interface) that does not support the FEFI function.

In this case, when a fault occurs in the optical fiber 13A (1010 in FIG. 10), the communication apparatus 11, upon detection of an LOS of the reception signal, transmits FEFI signals (1020 and 1030 in FIG. 10). However, the communication apparatus 12a, which does not support the FEFI function, may not detect the FEFI signals (1040 in FIG. 10), maintains a normal state (link-up state). In other words, the fault (abnormality) in the optical fiber 13A may not be detected.

Here, it may be said that an FEFI signal is a fault notification signal for notifying a remote apparatus of a reception fault at a local apparatus.

Accordingly, an embodiment is provided herein for a communication apparatus that includes an optical interface automatically detects (determines) whether or not an FEFI function is provided in a remote apparatus (communication apparatus provided with an optical interface, such as data terminal equipment, a transmission apparatus, or a media converter) connected to the communication apparatus by a transmission link and a reception link. This communication apparatus performs fault notification control in accordance with whether the FEFI function is supported or not.

Configuration of Optical Interface Apparatus

Figure 1:
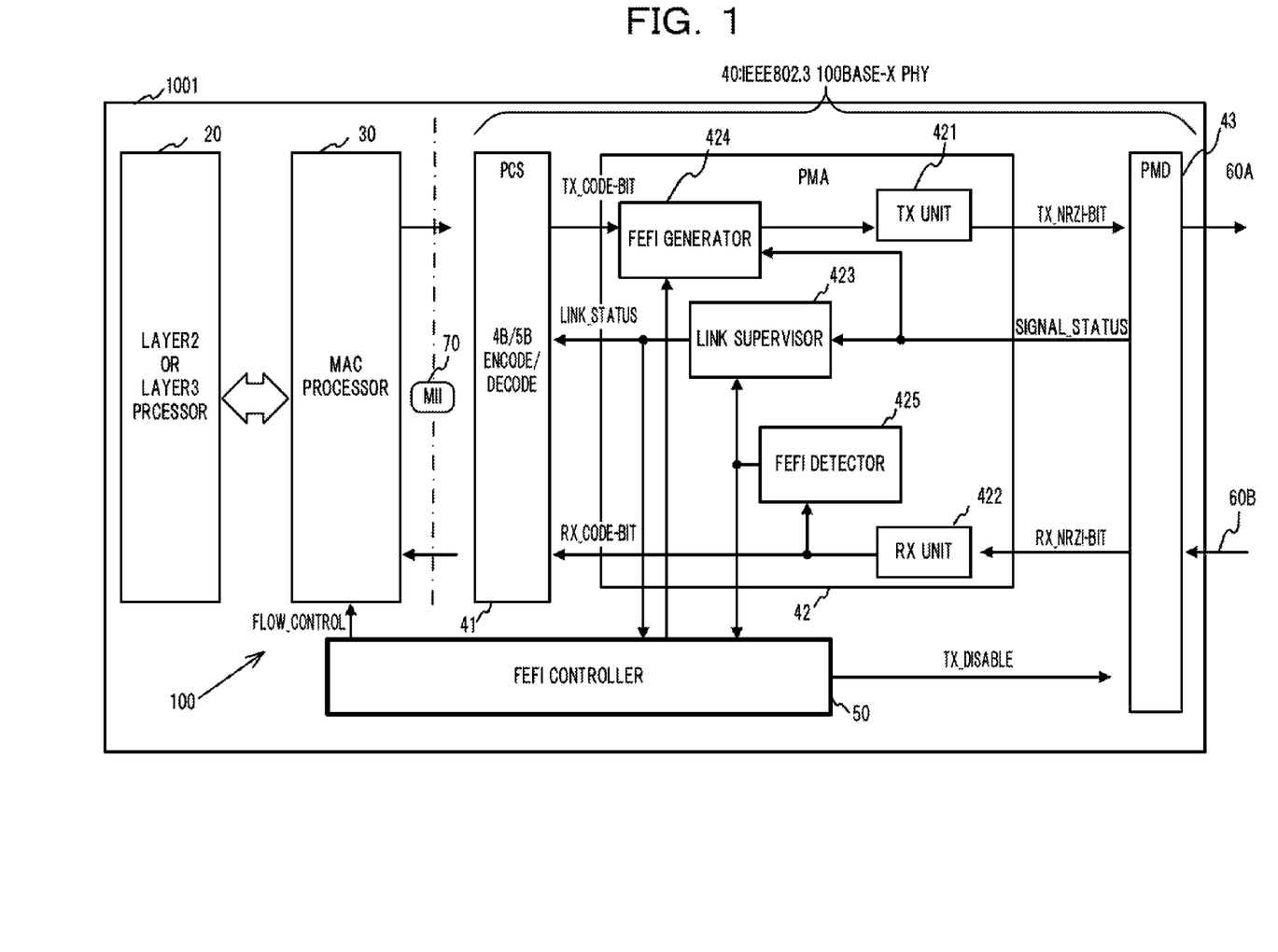
FIG. 1 is a diagram illustrating an exemplary configuration of an embodiment of a communication apparatus including an optical interface apparatus.

FIG. 1 is a diagram illustrating an exemplary configuration of an embodiment of a communication apparatus 1001 including an optical interface apparatus 100. The communication apparatus 1001 is, for example, data terminal equipment (DTE), a transmission apparatus (repeater), or a media converter. The communication apparatus 1001 includes a 100BASE-FX interface apparatus as the optical interface apparatus 100. The optical interface apparatus 100 includes the IEEE 802.3 100BASE-X PHY function, the FEFI function, and an FEFI controller 50 for performing FEFI related control.

More specifically, referring to FIG. 1, the optical interface apparatus 100 includes a layer 2 or layer 3 processor 20, a media access control (MAC) processor 30 connected to the layer 2 or layer 3 processor 20, an IEEE 802.3 100BASE-X physical layer interface (PHY) 40 connected via a media independent interface (MMI) 70, and an FEFI controller 50.

The PHY 40 includes a physical coding sublayer (PCS) 41, a physical medium attachment (PMA) 42, and physical medium dependent sublayer (PMD) 43. The PMA 42 includes a transmission (TX) unit 421, a reception (RX) unit 422, a link supervisor 423, an FEFI generator 424, and an FEFI detector 425. The respective configuration components will be individually described below.

PMD

The PMD 43 is an optical module supporting a 100BASE-FX interface having the function specified by "IEEE 802.3-2005 Clause 26" The PMD 43 includes a plurality of ports that house an optical fiber 60A (transmission link) and an optical fiber 60B (reception link), and via the optical fibers 60A and 60B connected to another communication apparatus (communication apparatus on the remote station side (refer to FIG. 3), hereinafter called a remote apparatus 1002), which is a communication counterpart of the communication apparatus 1001. The remote apparatus 1002 is, for example, data terminal equipment (DTE), a transmission apparatus, or a media converter, and includes an optical interface apparatus (100BASE-FX interface).

The PMD 43 performs electrical-optical conversion for an electrical signal from the PMA 42. This optical signal is transmitted over the optical fiber 60A. The PMD 43 also converts an optical signal received from the optical fiber 60B to an electrical signal, which is transferred to the PMA 42.

In addition, the PMD 43 has a function of detecting a reception signal, and may notify the PMA 42 of a signal reception status using a signal_status signal which indicates a signal reception status. The signal_status signal indicates "ON" when a reception signal has been detected, and "OFF" showing an LOS when a reception signal has not been detected. Furthermore, the PMD 43 may terminate optical output (optical signal transmission) to the optical fiber 60A on the basis of a tx_disable signal (transmission termination signal) from the FEFI controller 50.

The PMD 43 may be a remote apparatus interface unit that is capable of controlling signal transmission to a remote apparatus in accordance with an instruction by detecting a reception signal from the remote apparatus.

PMA

The TX unit 421 included in the PMA 42 has the function defined by "IEEE 802.3-2005 24.3.4.1". The TX unit 421 has a function of coding a data signal (tx_code-bit) input from the PCS 41 via the FEFI detector 425 within the PMA 42 into a non-return-to-zero inversion (NRZI) signal and transferring the coded signal (tx_nrzi-bit) to the PMD 43.

The RX unit 422 included in the PMA 42 has the function defined by "IEEE 802.3-2005 24.3.4.2 RX". The RX unit 422 has a function of decoding a data signal (rx_nrzi-bit) from the PMD 43 and transferring the decoded signal rx_code-bit to the PCS 41 and the FEFI detector 425 within the PMA 42.

The link supervisor 423 included in the PMA 42 has the function defined by "IEEE 802.3-2005 24.3.4.4 Link Monitor". The link supervisor 423 monitors a signal_status signal from the PMD 43 and a faulting signal (fault signal) from the FEFI detector 425, and determines a link status (status of the optical fiber 60A). The link supervisor 423 has a function of generating a link_status signal indicating the determination result regarding a link status, and transmitting the signal to the PCS 41 and the FEFI controller 50. The link_status signal indicates "TRUE" when the link status is normal and "FALSE" when the link status is abnormal (NG).

The FEFI generator 424 included in the PMA 42 has the function defined by "IEEE 802.3-2005 24.3.4.5 Far-End Fault Generate". The FEFI generator 424 has a function of generating an FEFI signal and outputting the signal to the TX unit 421. An FEFI signal is generated by the FEFI generator 424 when a signal_status signal from the PMD 43 indicates "OFF" and a fefi_gen_control signal (FEFI signal generation control signal) from the FEFI controller 50 indicates "TRUE".

The FEFI detector 425 included in the PMA 42 has the function defined by "IEEE 802.3-2005 24.3.4.6 Far-End Fault Detect". The FEFI detector 425 detects an FEFI signal from a signal received from the RX unit 422. The FEFI detector 425, having received an FEFI signal, generates a faulting signal and notifies the link supervisor 423 and the FEFI controller 50 of the signal. The state of a faulting signal becomes "TRUE" when an FEFI signal has been detected, and "FALSE" when an FEFI signal has not been detected.

As described above, the PHY 40 has, as the FEFI function, a function of generation and notification of an FEFI signal as a fault notification signal and a function of detecting a received FEFI signal, and is capable of detecting a fault in the transmission link through detection of an FEFI signal.

The PHY 40 may be a signal processing unit substantially connected to the above-described remote apparatus interface unit, i.e., the PMD 43.

PCS

The PCS 41 has the function defined by "IEEE 802.3-2005 24.2 Physical Coding Sublayer (PCS)". The PCS 41 mainly performs coding and decoding of a data signal using a coding/decoding method called 4B/5B. Data from a MAC processor 30 is coded by the PCS 41, and transferred to the PMA 42 as a data signal tx_code-bit. In addition, the PCS 41 decodes a data signal rx_code-bit from the PMA 42 and transfers the decoded signal to the MAC processor 30.

MAC Processor

The MAC processor 30 has the function of MAC Control defined by "IEEE 802.3-2005". The MAC processor 30 mainly has a function of performing flow control.

FEFI Controller

The FEFI controller 50 controls FEFI signal generation, and controls transmission output of the PMD 43. In addition, the FEFI controller 50 has a function of performing PAUSE FRAME generation control for the MAC processor 30.

The layer 2 or layer 3 processor 20 performs frame processing for layer 2 and/or layer 3, and is substantially connected to the MAC processor 30.

Figure 2:
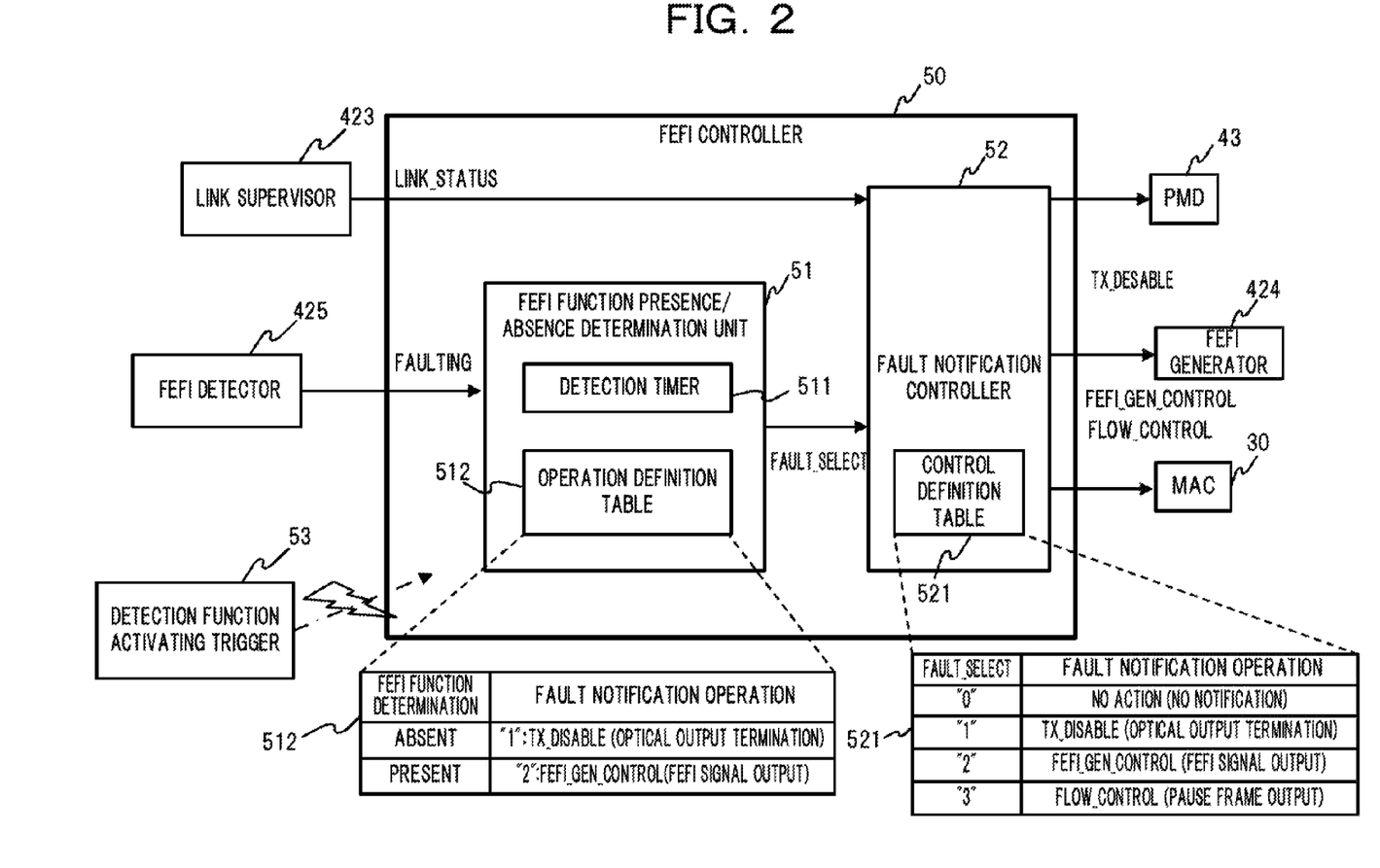
FIG. 2 is a detailed explanatory diagram of the FEFI controller illustrated in FIG. 1.

FIG. 2 is a detailed explanatory diagram of the FEFI controller 50. Referring to FIG. 2, the FEFI controller 50 includes an FEFI-function presence/absence determination unit 51 (hereinafter called a determination unit 51) as a determination unit and a FAULT notification controller 52 (hereinafter called a notification controller 52) as a notification controller. The determination unit 51 determines whether or not the remote apparatus 1002 has the FEFI function, and instructs the notification controller 52 on a method for sending "FAULT" (fault notification operation) in accordance with the determination result.

This instruction is issued by the determination unit 51 by delivering a fault_select signal (fault notification selection signal), which is an internal signal of the FEFI controller 50, to the notification controller 52. The determination unit 51 includes a detection timer 511 used in an FEFI function detection operation (described later) and an operation definition table 512 defining fault notification operations in accordance with the presence/absence of the FEFI function.

The notification controller 52 performs fault notification operation control in accordance with the result of determination regarding the presence/absence of the FEFI function in the determination unit 51. The notification controller 52 includes a control definition table 521 that defines the kinds of control (fault notification operations) in accordance with fault_select signals from the determination unit 51.

The notification controller 52 determines a fault notification operation in accordance with the fault_select signal from the determination unit 51 with reference to the control definition table 521. When a link_status signal indicating "FALSE" is detected, the notification controller 52 appropriately controls the PMD 43, the FEFI generator 424, or the MAC processor 30.

For instance, in the exemplary settings in the control definition table 521 illustrated in FIG. 2, the notification controller 52 does not perform control for failure notification, and FAULT notification is not performed, when a fault_select signal indicates "0".

On the other hand, when a fault_select signal indicates "1", the notification controller 52 performs termination control for optical output from the PMD 43 over the optical fiber 60A, as a fault notification control operation, which is different from FEFI signal transmission control. More specifically, the notification controller 52 generates a tx_disable signal (transmission termination signal) and sends the signal to the PMD 43, as fault notification operation control.

When a fault_select signal indicates "2", the notification controller 52 performs FEFI signal transmission control (fault notification signal transmission control). More specifically, as the FEFI signal transmission control, the notification controller 52 generates a fefi_gen_control signal and sends the signal to the FEFI generator 424.

When a fault_select signal indicates "3", the notification controller 52 performs PAUSE frame generation and transmission control as a fault notification operation, which is different from an FEFI signal transmission operation. More specifically, as the PAUSE frame generation and transmission control, the notification controller 52 generates a flow_control signal and sends the signal to the MAC processor 30.

The FEFI controller 50 may be an apparatus controller substantially connected to the remote apparatus interface unit (PMD 43) and the signal processing unit (PMA).

FEFI Function Detecting Operation

Figure 3:
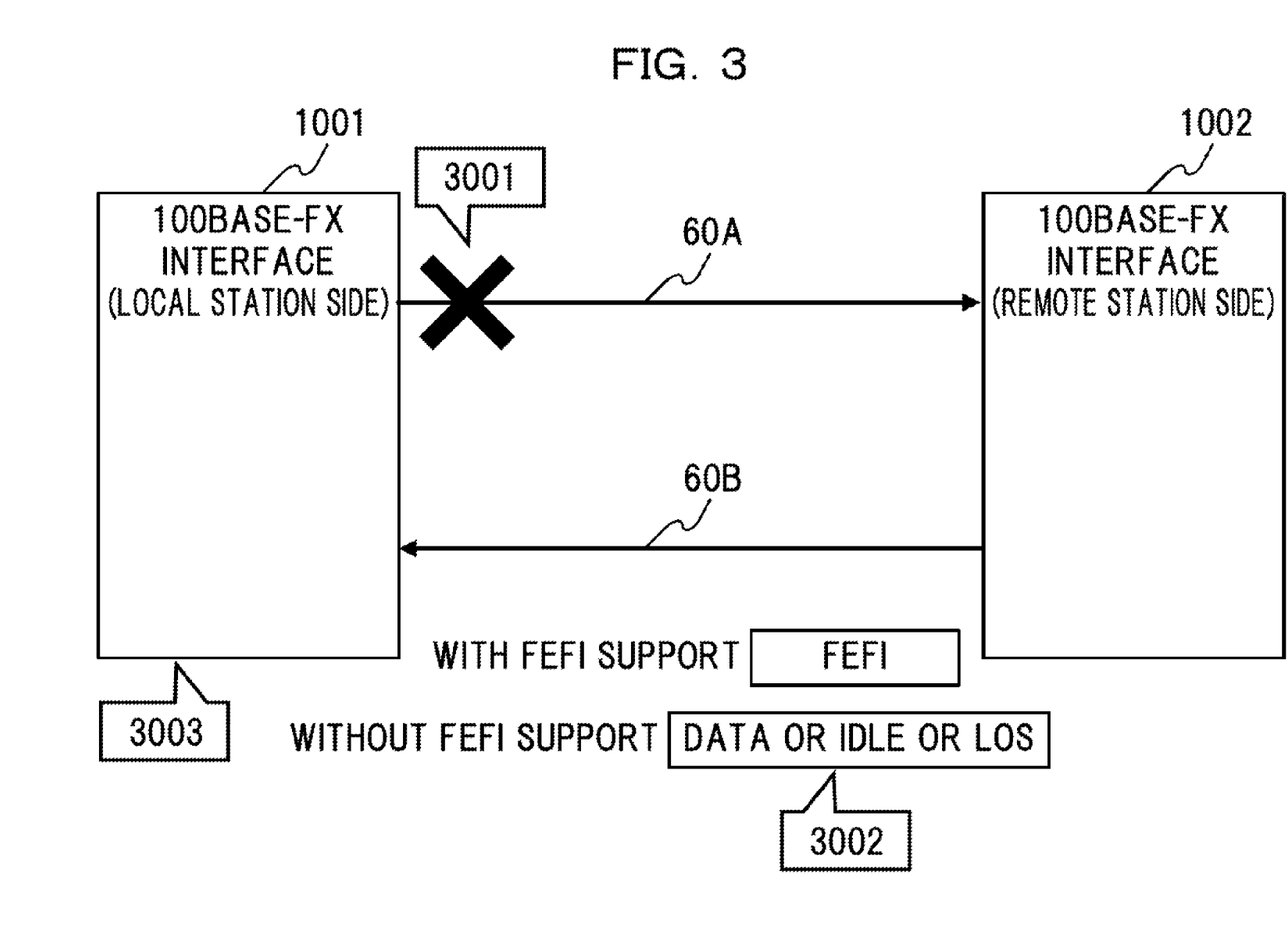
FIG. 3 is an explanatory diagram of an FEFI function detecting operation.

FIG. 3 is an explanatory diagram of an FEFI function detecting operation. Referring to FIG. 3, the communication apparatus 1001 is connected to the remote apparatus 1002 having a 100BASE-FX interface via the optical fibers 60A and 60B. From the viewpoint of the communication apparatus 1001, the optical fiber 60A is a transmission link for an optical signal to be transmitted to the remote apparatus 1002, and the optical fiber 60B is a reception link for an optical signal to be received from the remote apparatus 1002. In the communication apparatus 1001, the following operation is performed to determine whether or not the remote apparatus 1002 has the FEFI function.

First, referring to 3001 in FIG. 3, the FEFI controller 50 controls the PMD 43 (optical module) so as to forcibly terminate optical output to the transmission link (optical fiber 60A).

At this time, the remote apparatus 1002 transmits an FEFI signal over the optical fiber 60B to the communication apparatus 1001 using the FEFI function when the remote apparatus 1002 has an FEFI signal. On the other hand, when the remote apparatus 1002 does not have the FEFI function, an FEFI signal is not transmitted from the remote apparatus 1002, and the remote apparatus 1002 transmits a normal data signal or an idle signal. Alternatively, the remote apparatus 1002 upon detection of an LOS of a reception signal from the communication apparatus 1001, transmits an LOS signal (3002 in FIG. 3).

When an FEFI signal is detected from a signal received from the remote apparatus 1002, the communication apparatus 1001 determines that the remote apparatus 1002 has (supports) the FEFI function. On the other hand, when an FEFI signal is not detected from a signal received from the remote apparatus 1002, the communication apparatus 1001 determines that the remote apparatus 1002 does not have (support) the FEFI function (3003 in FIG. 3). This determination is performed by the determination unit 51.

Figure 4:
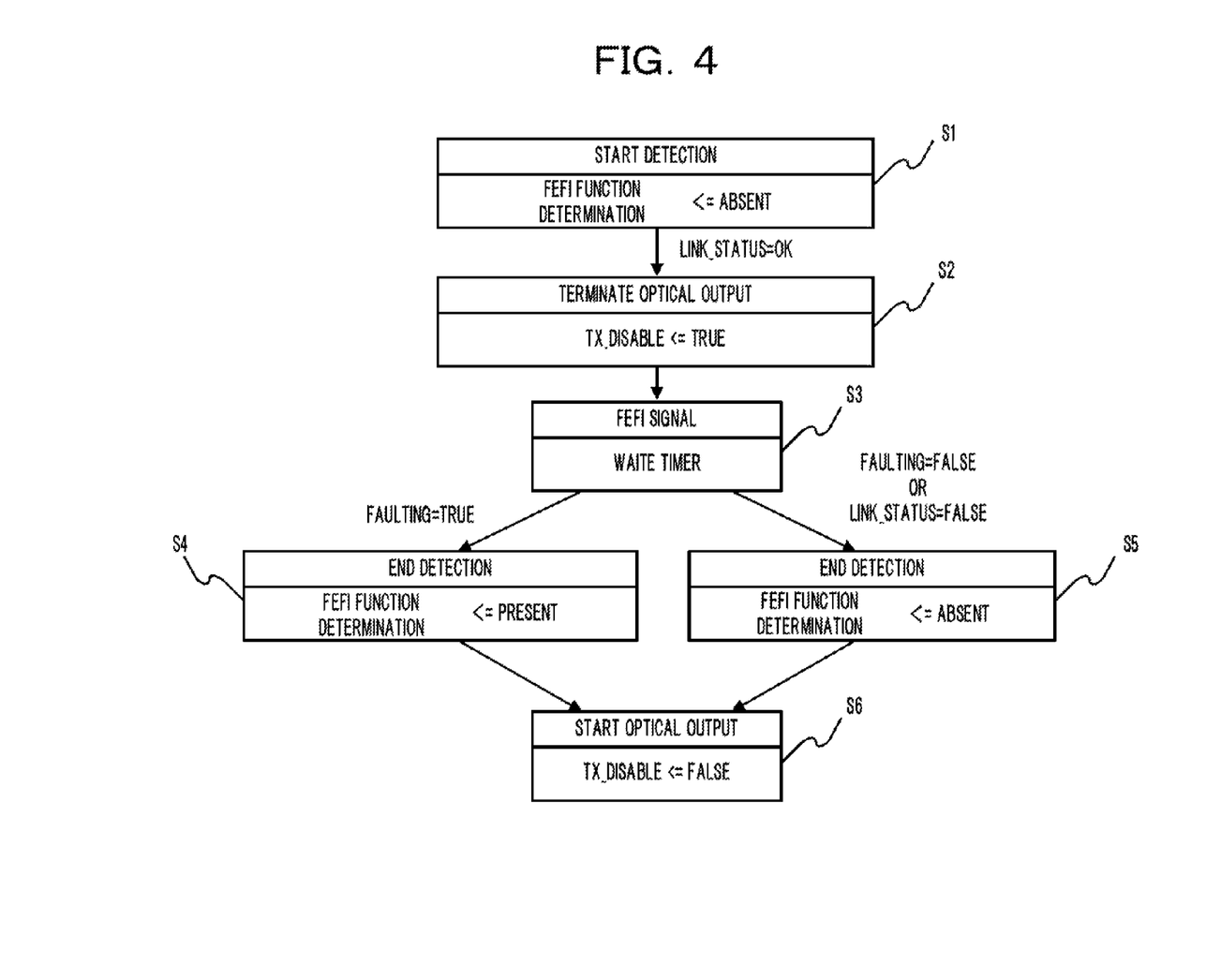
FIG. 4 is a flowchart illustrating a sequence of FEFI function detecting operations.

FIG. 4 is a flowchart illustrating an operation sequence performed by the FEFI controller 50 for detecting the presence/absence of the FEFI function. Hereinafter, the FEFI-function detecting operation sequence is described with reference to FIGS. 2 to 4. The sequence illustrated in FIG. 4 is started when a detection function activating trigger 53 (FIG. 2) is input to the FEFI controller 50.

The detection function activating trigger 53 is, for example, switching on of the power of the optical interface apparatus 100 or inputting of a detection operation start command from an input device (not shown). In this manner, the FEFI-function detecting operation sequence may be automatically started by switching on of the power of the optical interface apparatus 100 or at the time of activation caused by a reset. Alternatively, the FEFI-function detecting operation sequence may be started by an instruction (input of a command) from an operator while the optical interface apparatus 100 is in operation.

The determination unit 51, upon receipt of the detection function activating trigger 53, clears the result of determination regarding the presence/absence of the FEFI function stored in, for example, a work area of the determination unit 51 (S1 in FIG. 4). This makes the initial value of the determination result "absent" (without the FEFI function).

In the meantime, the notification controller 52, which has received the detection function activating trigger 53, waits for the state of a link_status signal received from the link supervisor 423 to become "TRUE", i.e., "OK (link-up state)". The notification controller 52, upon receipt of "link-up state", causes the state of a tx_disable signal sent to the PMD 43 to be "TRUE" (S2 in FIG. 4). This causes the PMD 43 to terminate optical output from a port connected to the optical fiber 60A. Thereby, optical output to the remote apparatus 1002 is terminated.

The determination unit 51, at a specified timing after receipt of the detection function activating trigger 53, starts timing using a detection timer 511. The specified timing may be, for example, right after inputting of the detection function activating trigger 53 or a time at which the tx_disable signal indicating "TRUE" starts or optical output is terminated, obtained by experimentation or the like.

During the operation of the detection timer 511, the determination unit 51 monitors a reception signal from the remote apparatus 1002 (S3 in FIG. 4). This monitoring is performed by monitoring a faulting signal which is input from the FEFI detector 425 to the determination unit 51. The FEFI detector 425 outputs a faulting signal indicating "TRUE" when FEFI signals are detected three times in succession from signals output from the RX unit 422, and otherwise outputs a faulting signal indicating "FALSE". The faulting signal indicating "TRUE" allows the communication apparatus 1001 to detect (recognize) a fault in the optical fiber 60A. Note that the timing period (monitoring period) timed by the detection timer 511 may be fixed or may be made to be variable using a variable timer for the detection timer 511.

The determination unit 51, upon receipt of a faulting signal indicating "TRUE" from the FEFI detector 425 during the monitoring period, terminates the FEFI function detecting operation; determines that the remote apparatus 1002 has (supports) the FEFI function; and writes "present" into the work area (S4 in FIG. 4).

On the other hand, when the determination unit 51 has not received a faulting signal indicating "TRUE" at the time-out of the detection timer 511, the determination unit 51 terminates the FEFI-function detecting operation; determines that the remote apparatus 1002 does not have (does not support) the FEFI function; and maintains the determination result "absent" (initial value) in the work area (S5 in FIG. 4).

When the FEFI-function detecting operation is finished, the determination unit 51 retrieves a code indicating a fault notification operation corresponding to the determination result from the operation definition table 512, and notifies the notification controller 52 of the code using a fault_select signal. The notification controller 52, having received the fault_select signal, changes the state of a tx_disable signal to "FALSE", whereby the PMD 43 resumes (starts) optical output from a port to the optical fiber 60A (S6 in FIG. 4).

Note that the layer 2 or layer 3 processor 20, the MAC processor 30, and the PHY 40 may be realized, for example, using hardware (electronic circuits). The FEFI controller 50 may be realized, for example, using hardware (electronic circuits). Alternatively, the function (function as the determination unit 51 and the notification controller 52) of the FEFI controller 50 may be realized by causing a processor (computer) such as a central processing unit (CPU, DSP) to execute a program stored in a computer storage medium such as a memory.

Failure Notification Operation

When the communication apparatus 1001 has become unable to receive a signal from the remote apparatus 1002 after the FEFI-function detecting operation, due to, for example, a fault (link-down state) of the optical fiber 60B, the following fault notification operation is performed.

First Example of Fault Notification

Figure 5A:
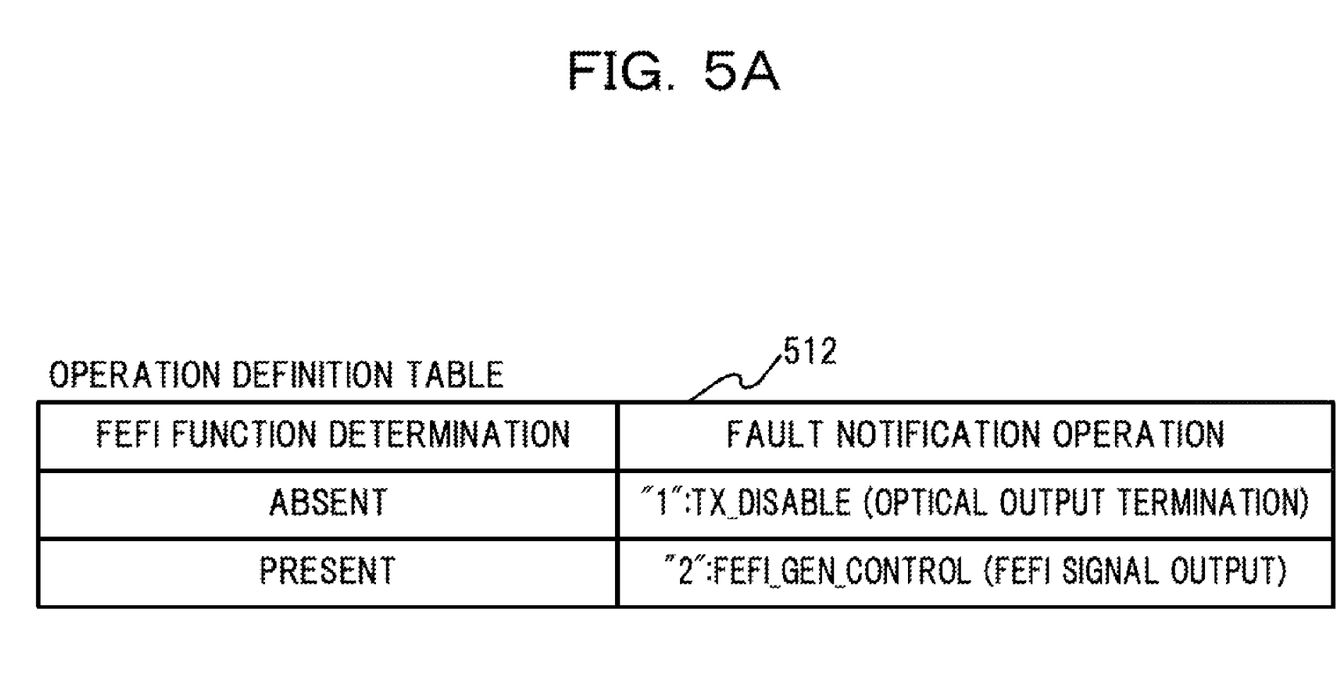
FIG. 5A is a table illustrating the content of an operation definition table in a first example of a fault notification operation.
Figure 5B:
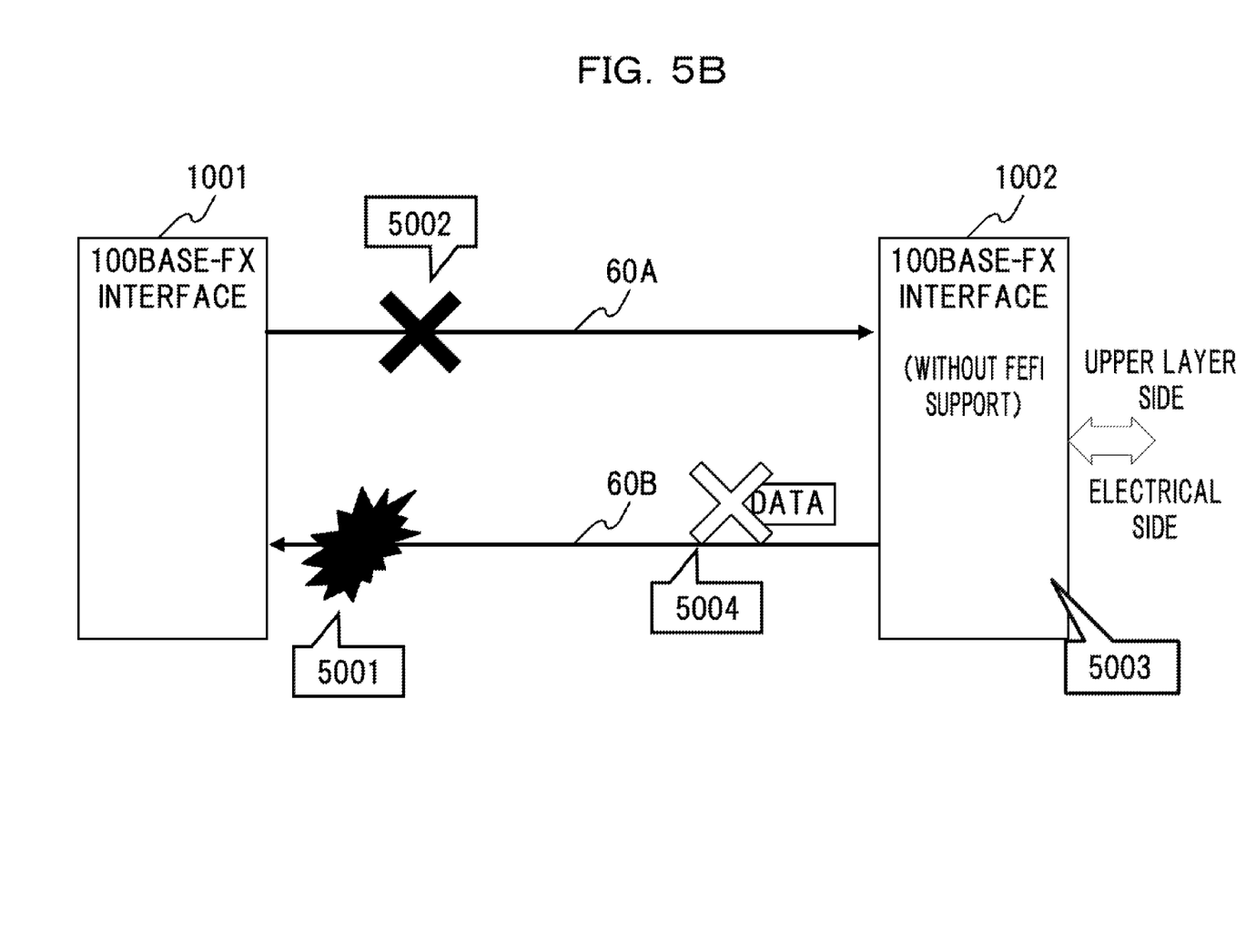
FIG. 5B is an explanatory operation diagram illustrating the first example of a fault notification operation.

FIG. 5A is a table illustrating exemplary settings (exemplary definition) of the operation definition table 512 applied to a first example of a fault notification operation (hereinafter called the first operation example). FIG. 5B is an explanatory diagram illustrating the first example of the fault notification operation in the case where the remote apparatus 1002 does not support the FEFI function. The remote apparatus 1002 has a 100BASE-FX interface, and is connected to the communication apparatus 1001 via the optical fibers 60A and 60B.

When a fault occurs in the optical fiber 60B connected to the remote apparatus 1002, the PMD 43 in the communication apparatus 1001 (optical interface apparatus 100) becomes unable to receive an optical signal from the remote apparatus 1002. In this case, the PMD 43 (FIG. 1) notifies the link supervisor 423 of a signal_status signal indicating "OFF (LOS)". On the basis of this signal_status signal, the link supervisor 423 outputs a link_status signal indicating "FALSE", i.e., "NG (link-down state)".

The link_status signal is input to the notification controller 52 (FIG. 2) of the FEFI controller 50. Here, it is assumed that the determination unit 51 in the FEFI controller 50 has already performed the operation of detecting the presence/absence of the FEFI function, and notification has been made of a fault_select signal indicating a fault notification operation corresponding to the determination result regarding the presence/absence of the FEFI function.

When it has been determined that the remote apparatus 1002 supports the FEFI function (determination result: "present"), the notification controller 52 is notified of the code "2" (FEFI signal output) as the fault_select signal (refer to FIG. 5A).

In this case, the notification controller 52, upon receipt of the link_status signal indicating "FALSE", refers to the control definition table 521 (FIG. 2), and determines a fault notification operation in accordance with the value (code) "2" of the fault_select signal. In this case, it is determined that "fefi_gen_control (FEFI signal output)" corresponding to the code "2" is the fault notification operation to be performed.

The notification controller 52 performs control in accordance with the fault notification operation. In this case, the notification controller 52 inputs a fefi_gen_control signal indicating "TRUE" to the FEFI generator 424 (FIGS. 1 and 2).

The FEFI generator 424, upon receipt of "fefi_gen_control=TRUE", confirms the value (state) of the signal_status signal from the PMD 43. When the signal_status signal indicates "OFF", the FEFI generator 424 generates an FEFI signal and sends the signal to the TX unit 421. This causes the FEFI signal to be transmitted to the remote apparatus 1002 through the optical fiber 60A. In other words, the remote apparatus 1002 is notified of a fault as an FEFI signal. The remote apparatus 1002, through detection of the FEFI signal, may determine that a signal output therefrom has ended in a line fault (link-down state).

On the other hand, when the remote apparatus 1002 does not support the FEFI function (determination result: "absent"), the notification controller 52 is notified of the code "1" (optical output termination) as a fault_select signal. This corresponds to "absent" in the determination column illustrated in FIG. 5A.

In this case, the notification controller 52, upon receipt of a link_status signal indicating "FALSE", refers to the control definition table 521 (FIG. 2), and determines a fault notification operation corresponding to the value (code) "1" of the fault_select signal. In this case, it is determined that "tx_disable (optical output termination)" corresponding to the code "1" is the fault notification operation to be performed.

The notification controller 52 inputs a tx_disable signal indicating "TRUE" to the PMD 43 (FIGS. 1 and 2) as control corresponding to the fault notification operation. The PMD 43, upon receipt of "tx_disable=TRUE", terminates optical output from the port connected to the optical fiber 60A. This allows the remote apparatus 1002 to detect an LOS of a reception signal from the communication apparatus 1001. This LOS allows the remote apparatus 1002 to recognize the fault (link-down state) in the optical fiber 60B, and to terminate optical signal transmission (optical output) to the communication apparatus 1001.

As described above, the communication apparatus 1001, upon detection (5001 in FIG. 5B) of a link-down state (LOS of a reception signal) of the reception link (optical fiber 60B) for an optical signal from the remote apparatus 1002, terminates (5003 in FIG. 5B) optical output to the transmission link (optical fiber 60A). This allows the remote apparatus 1002 to detect (5003 in FIG. 5B) the LOS of a reception signal from the optical fiber 60A and recognize a line fault, and, for example, to terminate (5004 in FIG. 5B) signal output to the optical fiber 60B.

In this manner, the communication apparatus 1001 may notify the remote apparatus 1002 of a fault of the reception link using an appropriate method even when the remote apparatus 1002 does not support the FEFI function. The remote apparatus 1002 may, for example, accordingly terminate signal transmission (optical output).

Second Example of Fault Notification

Figure 6A:
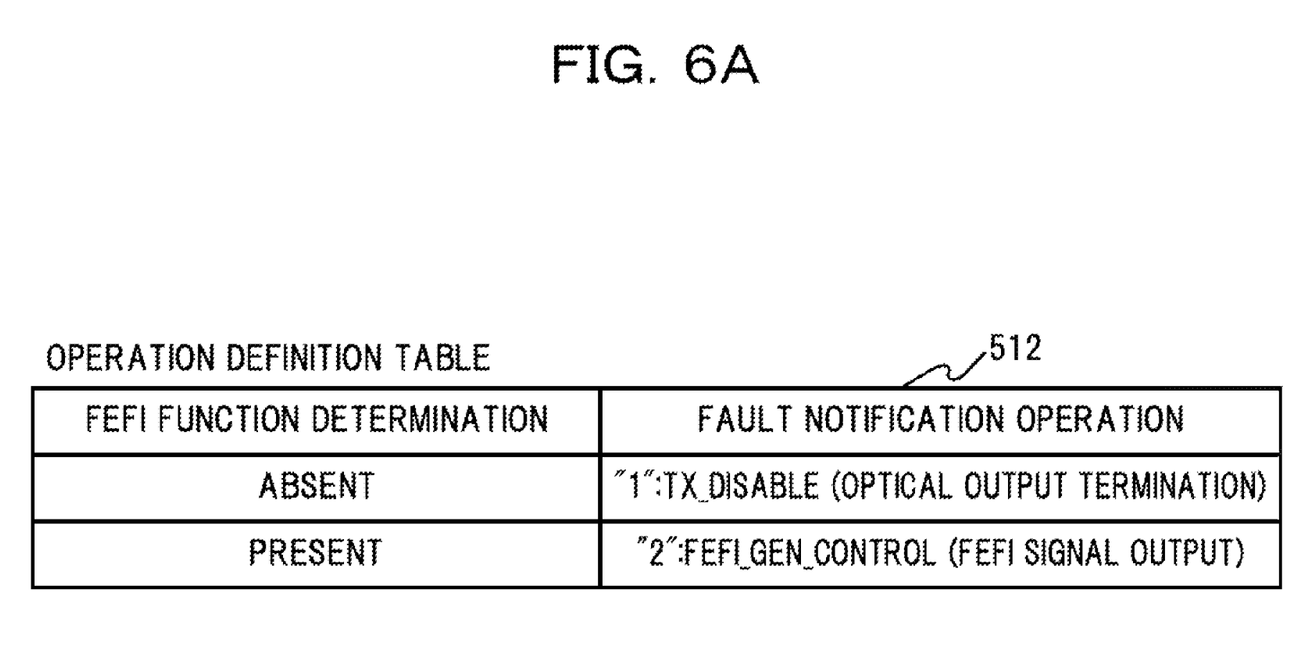
FIG. 6A is a table illustrating the content of an operation definition table in a second example of a fault notification operation.
Figure 6B:
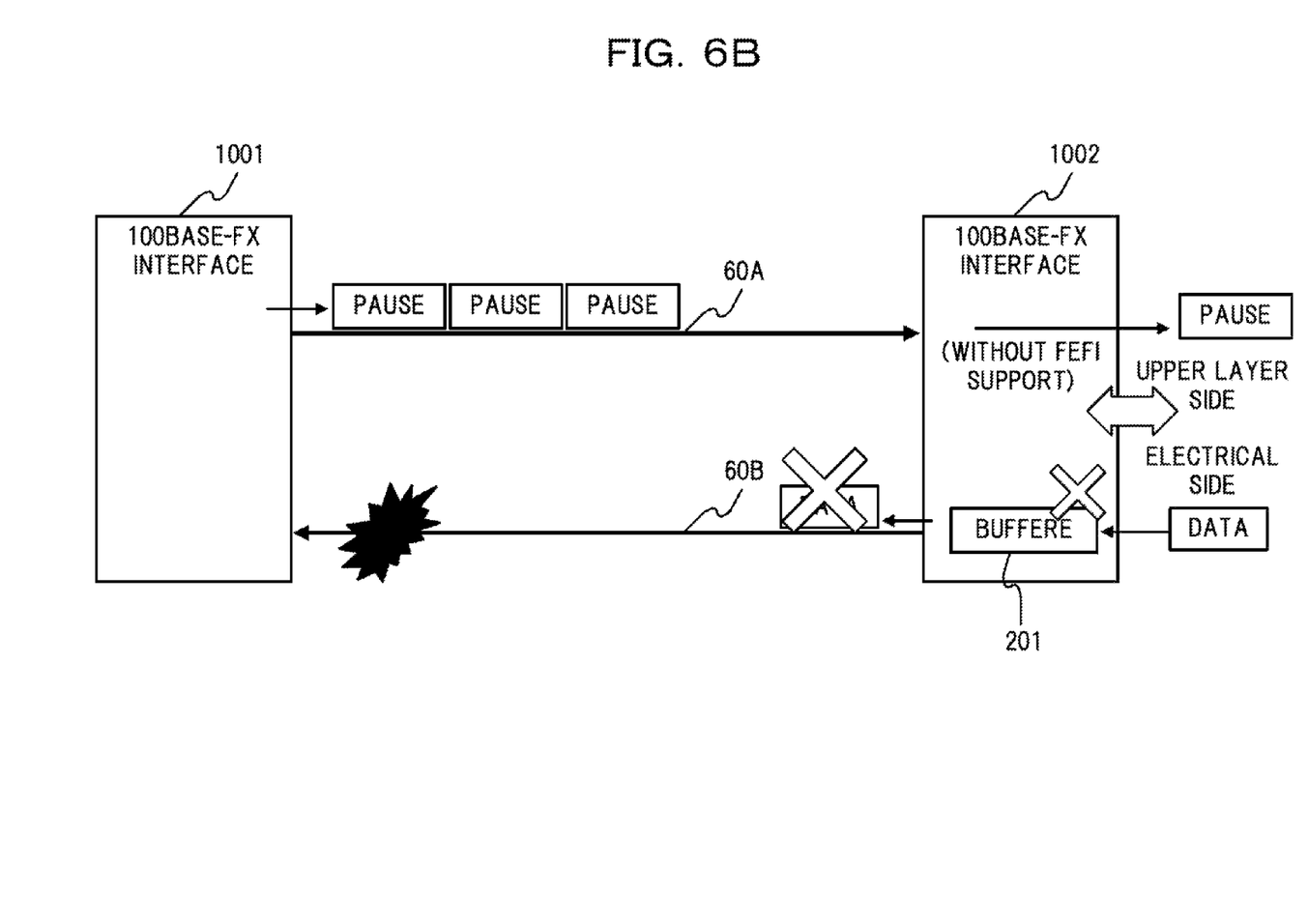
FIG. 6B is an explanatory operation diagram illustrating the second example of a fault notification operation.

FIG. 6A is a table illustrating exemplary settings (exemplary definition) of the operation definition table 512 applied to a second example of a fault notification operation (hereinafter called the second operation example). FIG. 6B is an explanatory diagram illustrating the second example of the fault notification operation in the case where the remote apparatus 1002 does not support the FEFI function.

In the second operation example, the registered content of the operation definition table 512 included in the determination unit 51 of the FEFI controller 50 is different from that of the first operation example (FIG. 6A). In other words, the code "3" (flow_control (PAUSE frame output)) is defined for the determination result ("absent") indicating that the FEFI function is not supported.

The operation in the case where the remote apparatus 1002 supports the FEFI function is substantially the same as that in the above-described first operation example, and the description thereof is omitted. The operation in the case where the remote apparatus 1002 does not support the FEFI function is as follows.

In the second operation example, the notification controller 52 is notified of the code "3" indicating output of a PAUSE frame using a fault_select signal, when the determination result of an FEFI detection operation is "absent". The notification controller 52, upon receipt of a link_status signal indicating "FALSE" from the link supervisor 423, refers to the control definition table 521 (FIG. 2), and determines "flow_control (PAUSE frame output)" corresponding to the value (code) "3" of the fault_select signal as a fault notification operation to be performed.

The notification controller 52 inputs a flow_control signal indicating "TRUE" to the MAC processor 30 (FIGS. 1 and 2) as control corresponding to the fault notification operation. The MAC processor 30 has a function of identifying a reception flow from the remote apparatus 1002 and generating and outputting PAUSE frames for the reception flow, as part of the flow control. The PAUSE frames generated by the MAC processor 30 under the control of the notification controller 52 are transmitted via the PHY 40 to the remote apparatus 1002 through the optical fiber 60A.

The PAUSE frame is a control frame for suppressing (temporarily stopping) the transmission of a signal corresponding to a target flow, and includes a detention period to be applied in the remote apparatus 1002. When a PAUSE frame is received by the remote apparatus 1002, output (transmission) from a transmission buffer 201 (FIG. 6B), which temporarily stores data to be transmitted over the optical fiber 60B, to the transmission line is stopped for the detention period defined by the PAUSE frame.

This causes output of a signal to the optical fiber 60B having a fault to be terminated.

PAUSE frames are continuously output from the communication apparatus 1001, for example, for a specified period or in a specified number. The transmission period of PAUSE frames or the number of PAUSE frames may be appropriately determined. This makes it possible to maintain the state in which output from the transmission buffer 201 of the remote apparatus 1002 is stopped. In the meantime, since transmission data from an upper layer is input to the transmission buffer 201, the amount of data stored in the transmission buffer 201 increases, and the transmission buffer 201 eventually overflows. This overflow of the transmission buffer 201 allows the remote apparatus 1002 to know that some fault has occurred in the communication apparatus 1001. In this manner, the remote apparatus 1002 may indirectly recognize an abnormality in the optical fiber 60B.

As described above, when a fault in the optical fiber 60B is detected by the communication apparatus 1001, PAUSE frames are transmitted from the communication apparatus 1001 to the remote apparatus 1002. In the remote apparatus 1002, output from the transmission buffer 201 is stopped in accordance with the PAUSE frames. The output from the transmission buffer 201 continues to be stopped until the transmission buffer 201 overflows. This allows the remote apparatus 1002 to detect an abnormality and the presence of a fault in the optical fiber 60B. In this manner, the communication apparatus 1001 may notify the remote apparatus 1002 which does not support the FEFI function of a fault using a method which is different from that of the first operation example.

Note that in the second operation example, it is assumed that the remote apparatus 1002 supports the flow control (transmission buffer control) using a PAUSE frame. However, the second operation example, different from the first operation example, allows for notification of line abnormality without causing a link-down state to be generated in the link from the communication apparatus 1001 to the remote apparatus 1002.

The above-described first and second operation examples may be configured so that the remote apparatus 1002 notifies another apparatus within the remote apparatus 1002 or located on the upper-layer side thereof of an abnormality such as a detected reception LOS or an overflow of the transmission buffer 201.

In the case where the remote apparatus 1002 does not support the FEFI function, if a fault occurs in the transmission link (optical fiber 60A) of the communication apparatus 1001, the communication apparatus 1001 is able to detect the fault, for example, through reception of fault notification (such as an LOS signal) different from an FEFI signal from the remote apparatus 1002.

According to various embodiments herein, the PMD 43 (optical module) of the communication apparatus 1001 performs an operation (forcible termination of optical output) for detecting an FEFI function. The determination unit 51 may automatically determine whether or not the remote apparatus 1002 has the FEFI function. When it is determined that the remote apparatus 1002 does not have the FEFI function, the notification controller 52, upon occurrence of a fault in the optical fiber 60B (reception link of the optical interface apparatus 100), performs fault notification operation control using an appropriate method different from FEFI signal transmission control (fault notification signal transmission control), such as termination of optical output to the remote apparatus 1002 or transmission of PAUSE frames (flow control). This allows the remote apparatus 1002 to detect a fault in the reception link even when the remote apparatus 1002 does not have the FEFI function.

The termination of optical output to the remote apparatus 1002 as a fault notification operation may be realized by the notification controller 52 notifying the PMD 43 of an optical output termination signal (tx_disable). Hence, there is no need to add a special component to the configuration of the PHY 40. Similarly, transmission of PAUSE frames as a fault notification operation may be realized such that the notification controller 52 notifies the MAC processor 30 of a flow_control signal by using a PAUSE frame transmission function (flow control function) supported by the MAC processor 30. Hence, there is no need to add a special component to the MAC processor 30 or the PHY 40.

Furthermore, when it is determined that the remote apparatus 1002 has the FEFI function, the notification controller 52, upon occurrence of a fault in the reception link (optical fiber 60B), may perform control of generation and transmission of an FEFI signal. This allows the remote apparatus 1002 to be notified of the fault in the reception link using the FEFI function (FEFI signal transmission function) provided in the communication apparatus 1001 (optical interface apparatus 100), when the remote apparatus 1002 has the FEFI function.

Furthermore, in the FEFI function detecting operation, the presence/absence of the FEFI function is determined such that the PHY 40 of the optical interface apparatus 100 terminates optical output to the remote apparatus 1002 and then monitors a reception signal from the remote apparatus 1002, and the FEFI function presence/absence determination unit 51 of the FEFI controller 50 determines whether or not an FEFI signal is included in the reception signal. This makes it possible to determine whether or not the remote apparatus 1002 has the FEFI function without modifying the remote apparatus 1002.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A communication apparatus comprising:
a remote apparatus interface unit connected to a remote apparatus via a reception link and a transmission link and detects via the reception link a reception signal from the remote apparatus, and configured to control signal transmission via the transmission link to the remote apparatus according to an instruction;
a signal processing unit that is coupled to the remote apparatus interface unit and is configured to detect a fault notification signal, transmitted from the remote apparatus, indicating a reception fault at the remote apparatus; and
an apparatus controller coupled to the remote apparatus interface unit and the signal processing unit, wherein the apparatus controller includes:
a determination unit that determines whether or not the remote apparatus has a function to transmit a fault notification signal; and
a notification controller that, upon detection of a fault in the reception link, performs control of a fault notification operation, which is different from a control of the function to transmit a fault notification signal, for the remote apparatus interface unit when it is determined that the remote apparatus does not have the function to transmit a fault notification signal.

2. The communication apparatus according to claim 1, wherein the notification controller, upon detection of the fault in the reception link, performs control of transmitting a fault notification signal to the remote apparatus, for the remote apparatus interface unit when the remote apparatus has the function to transmit a fault notification signal.

3. The communication apparatus according to claim 1, wherein the control of a fault notification operation is a control operation of terminating output to the transmission link, for the remote apparatus interface unit.

4. The communication apparatus according to claim 1, wherein the control of a fault notification operation is a control operation of transmitting a suppression signal for suppressing signal transmission, for the remote apparatus interface unit.

5. The communication apparatus according to claim 1, wherein the apparatus controller, when a power of the communication apparatus is switched on, performs control of terminating output to the transmission link, for the remote apparatus interface unit, and the determination unit determines whether or not the remote apparatus has the fault notification signal transmission function on the basis of whether or not a fault notification signal has been detected by the signal processing unit.

* * * * *